(12) United States Patent
Pant et al.

(10) Patent No.: US 10,010,874 B2
(45) Date of Patent: Jul. 3, 2018

(54) CATALYTIC DECOMPOSITION OF LOWER HYDROCARBONS TO PRODUCE CARBON OXIDES FREE HYDROGEN AND BAMBOO SHAPED CARBON NANOTUBES

(71) Applicants: Hindustan Petroleum Corporation Ltd., Mumbai (IN); Indian Institute of Technology, Delhi, New Delhi (IN); Centre for High Technology (CHT), Uttar Pradesh (IN)

(72) Inventors: Kamal Kishore Pant, New Delhi (IN); Sushil Kumar Saraswat, New Delhi (IN); Annaji Rajiv Kumar Tompala, Bangalore (IN); Kanaparthi Ramesh, Bangalore (IN); Venkata Chalapathi Rao Peddy, Bangalore (IN); Venkateswarlu Choudary Nettem, Bangalore (IN); Sri Ganesh Gandham, Bangalore (IN)

(73) Assignees: Hindustan Petroleum Corporation Ltd., Mumbai (IN); Indian Institute of Technology (IIT Delhi), New Delhi (IN); Centre for High Technology (CHT), Uttar Pradesh (IN)

( * ) Notice: Subject to any disclaimer, the term of this patent is extended or adjusted under 35 U.S.C. 154(b) by 0 days.

(21) Appl. No.: 14/893,643

(22) PCT Filed: Jul. 23, 2013

(86) PCT No.: PCT/IN2013/000460
§ 371 (c)(1),
(2) Date: Nov. 24, 2015

(87) PCT Pub. No.: WO2014/188439
PCT Pub. Date: Nov. 27, 2014

(65) Prior Publication Data
US 2016/0129424 A1 May 12, 2016

(30) Foreign Application Priority Data

May 24, 2013 (IN) .......................... 1852/MUM/2013

(51) Int. Cl.
*B01J 23/80* (2006.01)
*C01B 3/26* (2006.01)
(Continued)

(52) U.S. Cl.
CPC .............. *B01J 23/80* (2013.01); *B01J 21/04* (2013.01); *B01J 37/0201* (2013.01);
(Continued)

(58) Field of Classification Search
CPC .. B01J 23/80; B01J 37/08; B01J 37/18; C01B 31/0233; C01B 3/26; C01B 31/026;
(Continued)

(56) References Cited

U.S. PATENT DOCUMENTS

2003/0108480 A1\* 6/2003 Baker .................... B82Y 30/00
423/447.3

OTHER PUBLICATIONS

Ashok, et al., Catalytic Decomposition of Methane to Hydrogen and Carbon Nanofibers over Ni—Cu—SiO2 Catalysts, Energy & Fuels 2009; 23: 5-13.\*
(Continued)

*Primary Examiner* — Daniel C McCracken
(74) *Attorney, Agent, or Firm* — Marshall, Gerstein & Borun LLP

(57) ABSTRACT

In accordance with the present subject matter there is provided a process for catalytic decomposition of lower hydrocarbons to produce carbon oxides free hydrogen and bamboo shaped carbon nanotubes over a catalyst composition. The process for catalytic decomposition of lower hydrocarbons comprises contacting lower hydrocarbon over a catalyst composition, where the catalyst composition com-
(Continued)

prising, a catalyst, at least one modifying agent and a support material.

19 Claims, 12 Drawing Sheets

(51) Int. Cl.
    *C01B 31/02* (2006.01)
    *B01J 37/08* (2006.01)
    *B01J 37/18* (2006.01)
    *B01J 21/04* (2006.01)
    *B01J 37/02* (2006.01)
    *C01B 32/162* (2017.01)
    *C01B 32/17* (2017.01)
    *B01J 37/03* (2006.01)
    *B82Y 40/00* (2011.01)

(52) U.S. Cl.
    CPC ............ *B01J 37/035* (2013.01); *B01J 37/08* (2013.01); *B01J 37/18* (2013.01); *C01B 3/26* (2013.01); *C01B 32/162* (2017.08); *C01B 32/17* (2017.08); *B01J 37/031* (2013.01); *B82Y 40/00* (2013.01); *C01B 2202/34* (2013.01); *C01B 2202/36* (2013.01); *C01B 2203/0277* (2013.01); *C01B 2203/1076* (2013.01); *C01B 2203/1241* (2013.01); *C01P 2004/04* (2013.01); *C01P 2004/13* (2013.01); *C01P 2004/61* (2013.01)

(58) Field of Classification Search
    CPC ............ C01B 2202/36; C01B 2202/34; C01B 2203/0277; C01B 2203/1076; C01B 2203/1241; C01P 2004/04; C01P 2004/13; C01P 2004/61
    See application file for complete search history.

(56) References Cited

OTHER PUBLICATIONS

Zhang et al., "Hydrogen Production via the Direct Cracking of Methane Over Silica-Supported Nickel Catalysts", Applied Catalysis A: General 167, 1998, pp. 161-172.

Saraswat et al., "Ni—Cu—Zn/MCM-22 Catalysts for Simultaneous Production of Hydrogen and Multiwall Carbon Nanotubes via Thermo-Catalytic Decomposition of Methane", International Journal of Hydrogen Energy 36, 2011, pp. 13352-13360.

Patel et al., "Renewable Hydrogen Generation by Steam Reforming of Acetic Acid Over Cu—Zn—Ni Supported Calcium Aluminate Catalysts", http://pubs.acs.org, doi: 10.1021/bk-2012-1092.ch009, Jan. 20, 2012, 27 pages.

\* cited by examiner

Figrue 6

US 10,010,874 B2

CATALYTIC DECOMPOSITION OF LOWER HYDROCARBONS TO PRODUCE CARBON OXIDES FREE HYDROGEN AND BAMBOO SHAPED CARBON NANOTUBES

TECHNICAL FIELD

The subject matter described herein in general relates to a catalyst composition for decomposition of lower hydrocarbons comprising of a catalyst and modifying agent on a support material. The present disclosure also relates to a process for preparation of a catalyst composition for the decomposition of lower hydrocarbons. The present disclosure further relates to a process for producing carbon oxides free hydrogen and bamboo shaped carbon nanotubes by the catalytic decomposition of lower hydrocarbons in the presence of active, catalyst at suitable reaction temperatures and atmospheric pressure.

BACKGROUND

Petroleum fuels have long been predominantly used in industry and transport world-over. However, these fuels have a limitation of availability, and they also produce high levels of emissions especially carbon oxides viz carbon dioxide ($CO_2$), carbon monoxide (CO). Hydrogen ($H_2$) has been suggested to be a good alternative to replace conventional petroleum fuels. $H_2$ utility as a substitution to fossil fuels has attracted much attention in the last two decades because of its successful demonstration in space technologies and fuel cells, although it necessitates the use of a complex and costly manufacturing process. Conventional methods for production of hydrogen are methane steam reforming, methane partial oxidation or coal gasification routes. However, in addition to production of hydrogen, these methods also produce considerable amounts of carbon oxides ($CO_x$) like carbon dioxide, carbon monoxide and their separation is costly and detrimental to the electrodes used in fuel cells. Thus, hydrogen obtained through conventional methods has to be purified to render it free from $CO_x$ for fuel cell application and other applications. The conventional methods used for hydrogen production involve multistep operations and are not commercially viable.

The production of $CO_x$ free hydrogen could be advantageous in terms of environmental and economic aspects. The routes proposed for the production of clean hydrogen are ammonia ($NH_3$) decomposition, hydrogen splitting and catalytic decomposition of methane (CDM) or lower hydrocarbons. The later method is inexpensive as compared to the former methods for production of $CO_x$ free hydrogen. The catalytic decomposition of methane can be presented as following.

$$CH_4 \rightarrow C + 2H_2 \quad \Delta H = 17.8 \text{ kcal/mole}$$

CDM to pure hydrogen has several advantages as compared to conventional hydrogen production methods. CDM yields pure hydrogen at less severe conditions. Further, the process results in simultaneous production of high value nano-carbons along with hydrogen. This makes the above process as an important alternative process to produce COx free hydrogen. On the other hand, an important disadvantage of the process is that it produces carbon deposits on the catalyst that result in the catalyst deactivation. The regeneration of the deactivated catalyst is done by the combustion of carbon deposits which leads to generation of carbon dioxide. CDM on Ni, Fe and Co based catalysts on inert support materials to give hydrogen is reported. Ni based catalysts are more active and stable than other transition metals and results in higher hydrogen and carbon yield for methane decomposition (Zhang et al. *Catal. Lett.* 2004, 7).

Methane is decomposed to yield $CO_x$ free hydrogen and carbon on catalyst based on $Ni_xMg_yO$ (where x and y represent the mole content of Ni and Mg). Addition of Cu as a promoter to the catalyst composition enhances both methane decomposition and solid carbon yield and increases the catalyst life time up to 19 h (US2005/0063900). Methane decomposition in the presence of a catalyst based on. Fe and Ni to give hydrogen enriched fuel and carbon nanotubes have been carried out by using microwave irradiation. In this process, both the catalyst and methane were exposed to microwave irradiation at a selected microwave power (US2008/0210908). Catalysts synthesized by admixing Fe salt and in combination with Ni, Pd, and Mo have been used for decomposition of light hydrocarbons to hydrogen and carbon nanomaterial. The binary metal salts having at least Fe as one metal and in combination with Ni, Pd, Mo were found to be active for the production of hydrogen at the temperature range of 500 to 1000° C. (U.S. Pat. No. 6,875,417). Multi walled, size controlled carbon nanotubes were produced by the decomposition of carbon containing compounds over supported transitional metal based catalysts. The typical support materials used for the process were $SiO_2$, $SiO_2/Al_2O_3$, aerogel $Al_2O_3$ and MgO (U.S. Pat. No. 7,214,360).

Unsupported nano-sized nickel oxide particles have been utilized for the production $CO_x$ free hydrogen by methane decomposition especially at low temperatures, between 300 to 500° C. It has been observed that the catalyst performance is strongly dependent on the particle size of the catalyst (US2009/0140215). Production of carbon nanotubes can be achieved with the dimension of 3-150 nm having the aspect ratio of more than 100 by the decomposition of hydrocarbons over solid catalyst containing Co, and Mn on an inert support (US2009/0140215). Lower hydrocarbon in the presence of low concentration of oxidizing/reducing gas or moisture can be subjected to decomposition in the presence of catalyst to yield functional carbon nanomaterials and hydrogen. The amorphous carbon produced on the catalyst is removed (U.S. Pat. No. 7,767,182). Silica supported Ni catalyst have been used for catalytic methane decomposition at low reaction temperatures (550° C.) and these catalysts have produced long cylindrical hollow carbon filaments (Zhang et al. *Appl. Catal. A: Gen* 1998, 161).

One major drawback of the processes for the conversion of methane to give carbon oxides free hydrogen and carbon nanotubes is the rapid deactivation of the active catalyst. Further, the active catalyst deactivates at a rapid rate due to higher amorphous carbon deposition. The conversion of methane is in the range of 50-60% with low carbon yield. Although considerable research has been done on the activity of different catalysts for methane decomposition reaction, there is no effective catalyst available that operates with lesser deactivation for a longer time. While the concepts for catalytic decomposition of methane for production of hydrogen have been shown in the state of the art methods, there still exists a need to develop novel catalytic compositions for decomposition of lighter hydrocarbons to yield carbon nanotubes and $CO_x$ free hydrogen

SUMMARY

The present disclosure relates to a catalyst composition comprising: a catalyst in an amount in the range of 10% to 70% w/w of the total weight of the composition; at least one modifying agent in an amount in the range of 1% to 14% w/w of the total weight of the composition; and a support material in an amount in the range of 20% to 70% w/w of the total weight of the composition. The catalyst composition described herein is used for decomposition of lower hydrocarbons to produce carbon oxides free hydrogen and carbon nanotubes.

The present disclosure also relates to a process for producing a catalyst composition, the process comprising: dissolving at least two salts selected from the group consisting of Ni, Co, Fe, Cu, and Zn in water to obtain a solution; adding a support material to the solution to obtain a paste; drying the paste at a temperature of 120° C. for a period of 1 to 48 h to obtain a dried paste; calcining the dried paste at a temperature range of 400-600° C. for a period of 1 to 6 h to obtain a precursor catalyst; and reducing the precursor catalyst by hydrogen and in the presence of nitrogen in a temperature range of 380-450° C. for a period of 1 to 6 h to obtain a catalyst composition.

The present disclosure further relates to a process for producing carbon oxides free hydrogen and carbon nanotubes, the process comprising; placing a catalyst composition in a reactor; wherein the catalyst composition comprises of a catalyst in an amount in the range of 10% to 70% w/w of the total weight of the composition; at least one modifying agent in an amount in the range of 1% to 14% w/w of the total weight of the composition; and a support material in an amount in the range 20% to 70% w/w of the total weight of the composition; passing a flow of lower hydrocarbon in the presence of an optionally used carrier gas in the range of 10-100 mL/min over the catalyst composition at a temperature of 550-800° C. at atmospheric pressure; and recovering the carbon oxide free stream and carbon nanotubes wherein the stream comprising of hydrogen, unreacted lower hydrocarbon and the optionally used carrier gas.

These and other features, aspects, and advantages of the present subject matter will be better understood with reference to the following description and appended claims. This summary is provided to introduce a selection of concepts in a simplified form. This summary is not intended to identify key features or essential features of the claimed subject matter, nor is it intended to be used to limit the scope of the claimed subject matter

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

Figure 1:
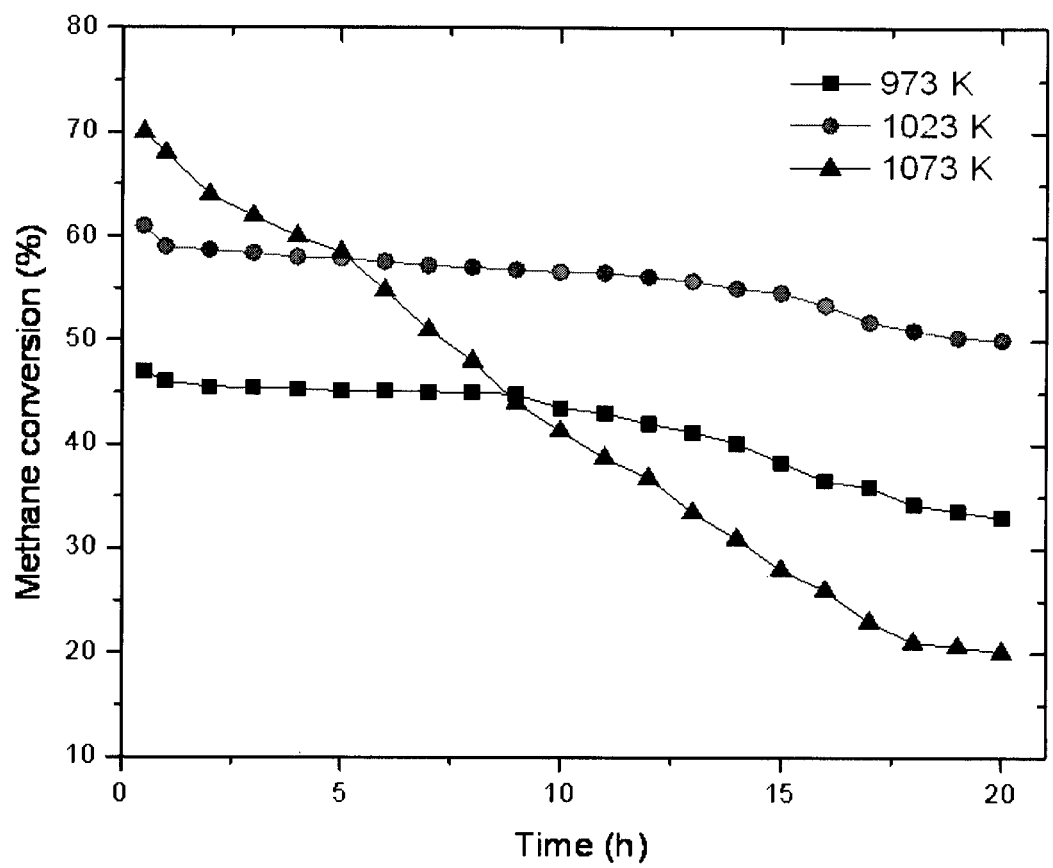
FIG. 1 graphically illustrates CDM at various reaction temperatures between 700 to 800° C. The relationship between methane conversions against reaction time is illustrated.

It should be appreciated by those skilled in the art that any block diagrams herein represent conceptual views of illustrative systems embodying the principles of the present subject matter.

DETAILED DESCRIPTION

The present invention now will be described more fully hereinafter. Indeed, the invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The subject matter described herein relates to catalytic decomposition of lower hydrocarbons to produce carbon oxides free hydrogen and bamboo shaped carbon nanotubes. Carbon oxides comprises of carbon dioxide and carbon monoxide.

The objective of the present disclosure relates to a catalyst composition which is used for decomposition of lower hydrocarbons to produce carbon oxides free hydrogen and carbon nanotubes.

Yet another objective of the present disclosure relates to a catalyst composition comprising: a catalyst in an amount in the range of 10% to 70% w/w of the total weight of the composition; at least one modifying agent in an amount in the range of 1% to 14% w/w of the total weight of the composition; and a support material in an amount in the range of 20% to 70% w/w of the total weight of the composition.

An embodiment of the present disclosure provides a catalyst composition, wherein the catalyst is selected from the group consisting of Ni, Co, and Fe. The metal in the catalyst composition may be present in their elemental form or as metal oxide or as metal salt or mixtures thereof.

Another embodiment of the present disclosure provides a catalyst composition, wherein the catalyst is in an amount in the range of 50 to 70% w/w of the total weight of the composition.

In another embodiment of the present disclosure, provides a catalyst composition, wherein the modifying agent is selected from the group consisting of Cu, Zn, oxides of Cu, oxides of Zn, and mixtures thereof.

The present disclosure further relates to a catalyst composition, wherein the support material is selected from the group consisting of alumina, zirconia, titania, silica, niobia, zeolites, MCM-22, mesoporous oxides and microporous oxides, preferably selected from the group consisting of $Al_2O_3$, $SiO_2$, and MCM-22 in an amount in the range of 20% to 40% w/w of the total weight of the composition. The preferred support material is γ-alumina.

In accordance to the present disclosure, the catalyst composition, more preferably, is 60% w/w Ni, 5% w/w Cu, 5% w/w Zn and 30% w/w $Al_2O_3$. The catalyst composition depicted as Cu(5%)Zn(5%)-Ni(60%)/$Al_2O_3$ contains 30% w/w $Al_2O_3$.

In further embodiment of the present disclosure, the lower hydrocarbon is selected from the group consisting of methane, ethane, and mixtures thereof.

The present disclosure relates to a process for producing a catalyst composition, the process comprising; dissolving at least two salts selected from the group consisting of Ni, Co, Fe, Cu, and Zn in water to obtain a solution; adding a support material to the solution to obtain a paste; drying the paste at a temperature of 120° C. for a period of 1 to 48 h to obtain a dried paste; calcining the dried paste at a temperature range of 400-600° C. for a period of 1 to 6 h to obtain a precursor catalyst; and reducing the precursor catalyst by hydrogen and in the presence of nitrogen in a temperature range of 380-450° C. for a period of 1 to 6 h to obtain a catalyst composition.

An embodiment of the present disclosure relates to a process, wherein salts of Ni are selected from the group consisting of nickel nitrate, nickel chloride, nickel formate, nickel acetate and nickel carbonate. Salts of nickel can be simply any organic or inorganic metal salts containing Ni. An embodiment of the present disclosure relates to a process, wherein the preferred salt of Ni is nickel nitrate.

Yet another objective of the present disclosure relates to a process, wherein salts of Co are selected from the group consisting of cobalt nitrate, cobalt chloride, cobalt formate, cobalt acetate, and cobalt carbonate. Salts of Co can be simply any organic or inorganic metal salts containing Co. An embodiment of the present disclosure relates to a process, wherein the preferred salt of Co is cobalt nitrate.

In another embodiment of the present disclosure, provides a process, wherein salts of Fe are selected from the group consisting of iron nitrate, iron chloride, iron formate, iron acetate, and iron carbonate. Salts of iron can be simply any organic or inorganic metal salts containing iron. An embodiment of the present disclosure relates to a process, wherein the preferred salt of Fe is iron nitrate.

The salts of Cu of the present disclosure are selected from the group consisting of copper nitrate, copper hydroxide, copper carbonate, copper formate and copper acetate. Salts of copper can be simply any organic or inorganic metal salts containing copper. An embodiment of the present disclosure relates to a process, wherein the preferred salt of Cu is copper nitrate.

The present disclosure further relates to a process, wherein salts of Zn are selected from the group consisting of zinc acetate, zinc hydroxide, zinc formate, zinc carbonate and zinc nitrate. Salts of zinc can be simply any organic or inorganic metal salts containing zinc. An embodiment of the present disclosure relates to a process, wherein the preferred salt of Zn is zinc nitrate.

The support material used in the present disclosure is selected from the group consisting of alumina, zirconia, titania, silica, niobia, zeolites, MCM-22, mesoporous oxides and microporous oxides, preferably selected from the group consisting of $Al_2O_3$, $SiO_2$, and MCM-22. An embodiment of the present disclosure relates to a process, wherein the preferred support is γ-alumina. Alumina is cost effective support used in the industry for preparation of catalyst.

The present disclosure further relates to a process, wherein water used for the preparation of solid gels is distilled and deionized. Any other purified form of water preferably non-ionic can also be used.

In accordance to the present disclosure, the catalyst composition is a mixed oxide with meso or micro pores with nano or microsize of metal (NiO) particles. The metal oxide (Ni) structure is confirmed by the x-ray diffraction, In accordance to the present disclosure, the catalyst composition is a mixed oxide or oxides with macro or meso or micro pores with either ordered or disordered pore geometry with nano or microsize of metal active particles. The average NiO crystallite size is in the range from 20 to 35 nm. Small crystallites are preferred for the catalyst composition.

The present disclosure further relates to a process for producing a catalyst composition comprising; dissolving nitrate salts of Ni, Cu, and Zn in water to obtain a solution; adding alumina to the solution to obtain a paste; drying the paste at a temperature of 120° C. for a period of 24 h to obtain a dried paste; calcining the dried paste at a temperature range of 550° C. for a period of 6 h to obtain a precursor catalyst; and reducing the precursor catalyst by hydrogen in the presence of nitrogen preferably in the temperature range of 450° C. for a period of 6 h to obtain a catalyst composition.

The present disclosure further relates to a process for producing carbon oxides free hydrogen and carbon nanotubes, the process comprising; placing a catalyst composition in a reactor; passing a flow of lower hydrocarbon in the presence of an optionally used carrier gas in the range of 10-100 mL/min over the catalyst composition at a temperature of 550-800° C. at atmospheric pressure; and recovering the carbon oxide free stream and carbon nanotubes wherein the stream comprising of hydrogen, unreacted lower hydrocarbon and the optionally used carrier gas.

The present disclosure further relates to a process for producing carbon oxides free hydrogen and carbon nanotubes, the process comprising; placing a catalyst composition in a reactor; wherein the catalyst composition comprises of a catalyst in an amount in the range of 10% to 70% w/w of the total weight of the composition; at least one modifying agent in an amount in the range of 1% to 14% w/w of the total weight of the composition; and a support material in an amount in the range 20% to 70% w/w of the total weight of the composition; passing a flow of lower hydrocarbon in the presence of an optionally used carrier gas in the range of 10-100 mL/min over the catalyst composition at a temperature of 550-800° C. at atmospheric pressure; and recovering the carbon oxide free stream and carbon nanotubes wherein the stream comprising of hydrogen, unreacted lower hydrocarbon and the optionally used carrier gas.

The reactor used in the present disclosure for decomposition of lower hydrocarbons is selected from the group consisting of fixed bed tubular reactor and fluidized bed reactor, preferably from fixed bed tubular reactor.

An embodiment of the present disclosure relates to a process, wherein the lower hydrocarbon in passed over the catalyst at a rate of 10-100 mL/min with GHSV in the range of (600-12000 ml/h·$g_{cat}$). The preferred GHSV is 3600 ml/h·$g_{cat}$ Yet another objective of the present disclosure relates to a process, wherein the carrier gas is selected from the group comprising of nitrogen and hydrogen. A further embodiment of the present disclosure relates to a process, wherein the carrier gas is hydrogen.

The catalyst composition disclosed in the present disclosure is heated at a temperature is 700-800° C. Yet another objective of the present disclosure relates to a process, wherein the catalyst is heated at a temperature is 750° C.

In another embodiment of the present disclosure provides a process, wherein the carbon nano-tubes are bamboo-like carbon nanotubes.

In another embodiment of the present disclosure, provides a process for preferentially producing high purity bamboo-like carbon nanotubes.

In another embodiment of the present disclosure, the high purity of bamboo shaped carbons is obtained with outer and inner diameter in the range of 60-55 nm and 25-30 μm and 2-3 μm in length.

In another embodiment of the present disclosure, wherein the catalyst composition exhibited high stability of more than 70 h at 750° C.

Yet another objective of the present disclosure relates to a process, wherein high purity bamboo shaped carbon nano-tubes are separated by centrifugation.

Yet another objective of the present disclosure relates to a process, wherein the process comprising; placing a catalyst composition in fixed bed tubular reactor; wherein the catalyst composition comprises of 60% w/w Ni, 5% w/w Cu, 5% w/w Zn and 30% w/w $Al_2O_3$; passing a flow of methane in the presence of a carrier gas at the rate of 20 ml/min, over the catalyst composition at a temperature of 750° C. at atmospheric pressure; and recovering the carbon oxide free stream and carbon nanotubes wherein the stream comprising of hydrogen, unreacted methane and the optionally used carrier. The optionally used carrier gas can be hydrogen or nitrogen.

The following definitions and analytical instrumentation tools are used in this description of the invention:

(a) The BET (Brunauer-Emmett-Teller) surface area analyzer provides precise surface area evaluation of catalytic materials that are formed and used in this description;

(b) The SEM (Scanning electron microscope) provides precise information about the sample surface including external morphology (texture), chemical composition, and crystalline structure and orientation of materials making up the sample surface;

(c) The HRTEM (High-resolution transmission electron microscopy) is an imaging mode of the transmission electron microscope (TEM) that allows the imaging of the crystallographic structure of a sample at an atomic scale. This method of analysis provides a way to study nano-scale properties of crystalline material;

(d) Thermo-gravimetric analysis or thermal gravimetric analysis (TGA) is a method of thermal analysis in which changes in physical and chemical properties of materials are measured as a function of increasing temperature providing information about chemical phenomena including chemisorptions, dehydration, decomposition of solid-gas reactions;

(e) Temperature-programmed reduction (TPR) is an analytical tool used for the characterization of metal oxides, mixed metal oxides, and metal oxides dispersed on a support material providing quantitative information on yields of the reducibility of the oxide's surface, as well as the heterogeneity of the reducible surface;

(f) Carbon nanotubes (CNTs) are allotropes of carbon with a cylindrical nanostructure and have unusual properties which are valuable for nanotechnology applications in the field of electronics, optics and material science.

(g) Bamboo-like Carbon Nano-Tubes (BCNTs) are carbon nanotube structures which have bamboo like knots in the tubular structure formed.

(h) Gas hourly space velocity (GHSV=Reactant Gas Flow Rate/Reactor Volume) is a measure for relating the reactant gas flow rate to the reactor volume.

(i) Sonication is a process of applying ultra-sound energy to agitate particles in a sample.

(j) Doping is an intentional process to introduce impurities into a given pure substance so as to modify its properties.

(k) Raman spectroscopy is a method to analyze the characteristic of a material by the way it scatters incidental light.

The objective of the present disclosure relates to a compositions and a process for production of carbon nanotubes (CNT's) and oxide free hydrogen through decomposition of lighter hydrocarbons, like methane, over a multi-metal catalyst. Under optimum reaction conditions, and with catalysts of the present subject matter, the methane is decomposed to yield oxide free hydrogen and CNT's. The hydrogen thus obtained can be used as a fuel and the CNT's, which are allotropes of carbon, possess valuable applications in the field of electronics, optics and material science.

The routes proposed for production of clean hydrogen are $NH_3$ decomposition, hydrogen splitting and catalytic decomposition of hydrocarbons, like methane. Catalytic decomposition of methane to yield pure hydrogen is an important and economic alternative to produce COx free hydrogen. This process has several advantages as compared to conventional hydrogen production. This method yields pure hydrogen at less severe conditions. Further advantage of the process is that the production of high value nano carbon simultaneously with hydrogen. The catalytic decomposition of methane can be presented as following:

$$CH_4 \rightarrow C + 2H_2 \ \Delta H = 75.6 \text{ kJ/mol.}$$

Catalytic decomposition of methane to hydrogen based on Ni, Fe and Co based catalysts on inert support materials has been reported in the state of the art methods. In one conventional method, it has been observed that methane is decomposed to hydrogen and carbon and no carbon oxides was formed, on $Ni_xMg_yO$ (where x and y represent the mole content of Ni and Mg), when the reaction was carried out under 425-625° C.

In another implementation, the effect of Cu on catalyst composition has been studied. Cu was used as a promoter to enhance the catalytic activity of the composition $Ni_xMg_y$-$Cu_zO$ where x, y and z showed the mole content of Ni, Mg and Cu respectively. It was observed that addition of Cu enhances the methane conversion and solid carbon yield during catalytic decomposition of methane, as compared to performing the reaction under similar optimum reaction parameters, in the absence of Cu. In an illustrative example, 78% Ni/MgO resulted maximum methane conversion and solid carbon yield 24.4% and 143 g-C/g-Cat for the life time of 17 h at 575° C. Addition of Cu promoter enhanced the maximum Methane conversion and solid carbon yield up to 46.5% and 263 g-C/g-Cat at 725° C.

In another implementation, the production of carbon nanotubes was achieved by the decomposition of hydrocarbons over solid catalyst contains Co, Mn on an inert support. A maximum, yield of 50.3 $gCNT/g_{cat}$ was obtained for the reaction duration of 108 min at the reaction temperature of 650° C.

State of the Art methods have shown that the synthesized catalysts usually resulted in methane conversion in the range of 50-60% with lower yield of carbon. Apart from it, the synthesized catalyst deactivates at a faster rate due to higher amorphous carbon deposition on the surface of the catalyst. This results in deactivation of the catalyst and the regeneration of the deactivated catalyst is conventionally achieved by combustion of the carbon deposits that lead to oxide production.

The present study mainly aims at developing a catalyst composition, process analysis as well as kinetic study for methane decomposition to produce high yield of COx-free hydrogen along with carbon nanomaterials.

According to an implementation of the present subject matter, the catalyst composition comprising a support material, a mixed metal oxide with active components of Fe, Ni, Co and a modifying agent, where the modifying agent can include either oxides of Cu, Zn, K etc., or derivatives of Cu or Zn or a combination of both. In said implementation, the purpose of using Cu or Zn oxides or derivatives or a combination of both as promoters is to enhance the catalytic activity of the composition. Further, the catalytic support can include one of $Al_2O_3$, $SiO_2$ or MCM-22. The mixed metal oxides can include oxides of various active metals like Ni, Co and Fe in various oxidation states.

In one implementation, the catalysts of the present disclosure can be represented by $Ni_xCu_yZn_z$ over an $Al_2O_3$ support, wherein the x, y and z reflect the weight percentage of Ni, Cu and Zn respectively. The weight percentage of Ni, Cu and Zn ranged from 50-70% for Ni and 3-7% for Cu and 3-7% for Zn. However, the catalyst was found to be most effective when the percentage weights of Ni, Cu and Zn were 60%, 5% and 5% respectively. The purpose of addition of small amount of Cu is to enhance the reducibility of dispersed $Ni^{2+}$ species and the thermal stability of catalyst. One of the preferred methods for preparing the catalyst $Ni_x$-$Cu_yZn_z$ over an $Al_2O_3$ support of the present subject matter is by co-precipitation method. In the said method, co-precipitated catalysts were synthesized by co-precipitation of their respective nitrates in an aqueous solution and the precipitates subsequently washed, dried and calcined at 550° C.

In another method, the catalyst was prepared by wet impregnation method. In the said method, wet impregnated catalysts were prepared by impregnating metals precursor (Ni, Cu and Zn) on γ-Alumina (BET surface area=197 m²/g) in a rotary vacuum evaporator for 2 h followed by dying and calcination at 550° C. for 5 h to promote thermal decomposition of nitrates into their respective oxides. The method of the preparation of the catalyst can be achieved with other preparation methods such as anchoring, deposition, precipitation, grafting, chemical vapor deposition etc that are available in the state of the art.

In one implementation, the catalyst composition of the present subject matter is capable of producing substantially carbon oxide-free hydrogen and substantially pure carbon by the decomposition of methane over a relatively low temperature range of 550° to 800° C. The stability of the catalytic composition to perform methane decomposition is evaluated under different conditions of temperature ranging from 550-800° C. and further, the stability was also evaluated under varied pressure conditions. Further, the CNT's thus obtained upon catalytic decomposition of methane, that are deposited on the surface of the catalyst are separated from the catalyst using instrumentation techniques like sonication, centrifugation, etc.

EXAMPLES

The following examples are given by way of illustration of the present invention and should not be construed to limit the scope of present disclosure. It is to be understood that both the foregoing general description and the following detailed description are exemplary and explanatory only and are intended to provide further explanation of the claimed subject matter.

The activity of catalysts for methane conversion and hydrogen yield was compared in a fixed-bed quartz reactor (i.d.=1.9 cm, o.d.=2.1 cm and length=60 cm) in a conventional down flow mode. The catalyst (1.0 g) was loaded in the reactor, and then packed with small amount of inert to prevent the channeling. A chrome-alumina-type thermocouple was placed into the annular space between the reactor, and the furnace to minimize the temperature difference between the catalyst bed and the thermocouple. The feed was introduced through a mass flow controller (Bronkhorst High-Tech, Netherlands) by passing the reactant gas mixture of $CH_4/N_2$ over the catalyst bed. Prior to activity tests, all calcined samples in the oxidized state were reduced in-situ with a total volumetric flow rate of 60 ml/min in a mixture $N_2$ and $H_2$ (1:1 ratio) at 450° C. for 5 h. Initially, pure nitrogen was allowed into the reactor, to create an inert atmosphere in the reactor. Catalytic $CH_4$ decomposition was performed at atmospheric pressure by passing a flow of methane along with $N_2$ or $H_2$ in the range of 10-100 mL/min and reaction temperature at 550-800° C. The composition of the outlet gas from the reactor was determined by Nucon-5700 gas chromatograph (GC), equipped with a thermal conductivity detector, a carbosphere column (80-100 mesh) with argon as the carrier gas.

Example 1: Fabrication and Growing of Bamboo Shaped Carbon-Nanotubes (BCNT's)

Experiments were performed to investigate the effect of reaction temperature and gas hourly space velocity (GHSV, $h^{-1}$) on methane conversion and bamboo shaped carbon nano Tubes (BCNTs) formation at experimental conditions. The blank experiment was also carried out in the reactor filled with quartz particles with a feed consisting of methane and nitrogen in a ratio of 1:1 at a GHSV of 3.6 L/h·$g_{cat}$ and in the temperature range of 550-800° C. The conversion of methane was less than 2% in all of these experiments, revealed that the methane decomposition was negligible without catalyst in the above temperature ranges.

To explore the catalytic stability of the catalyst, methane conversion as a function of time on stream was measured at reaction temperatures of 700, 750 and 800° C. and the results are reported in FIG. 1. It can be seen that the initial methane conversion was increased with the reaction temperature but the stability of the catalyst decreased at higher temperature (800° C.). The highest conversions of methane at three different temperatures were 47%, 62%, and 70%, respectively. It was also observed that the catalyst was fairly stable at 700 and 750° C., and 45% and 57% methane conversion could be obtained steadily for approximately 15 h. However, at 800° C., catalyst started declining in its catalytic activity just after 5 h on stream, indicating that the catalyst lost its activity and stability at high temperatures due to sintering of Ni particle and catalysts deactivation.

Example 2: Kinetics of Decomposition Reaction

Preliminary experiments were carried out at different GHSV and particle size to eliminate mass transfer and diffusional resistance. The absence of diffusional resistance was confirmed estimated by Weisz-Prater criterion. According to this criterion, in the absence of pore diffusion resistance, the following condition has to be satisfied:

$$\varphi = \frac{r_0 \rho R_p^2 \tau}{\epsilon D_{CH4-N2} C_S} < 1 \quad (1)$$

Figure 2:
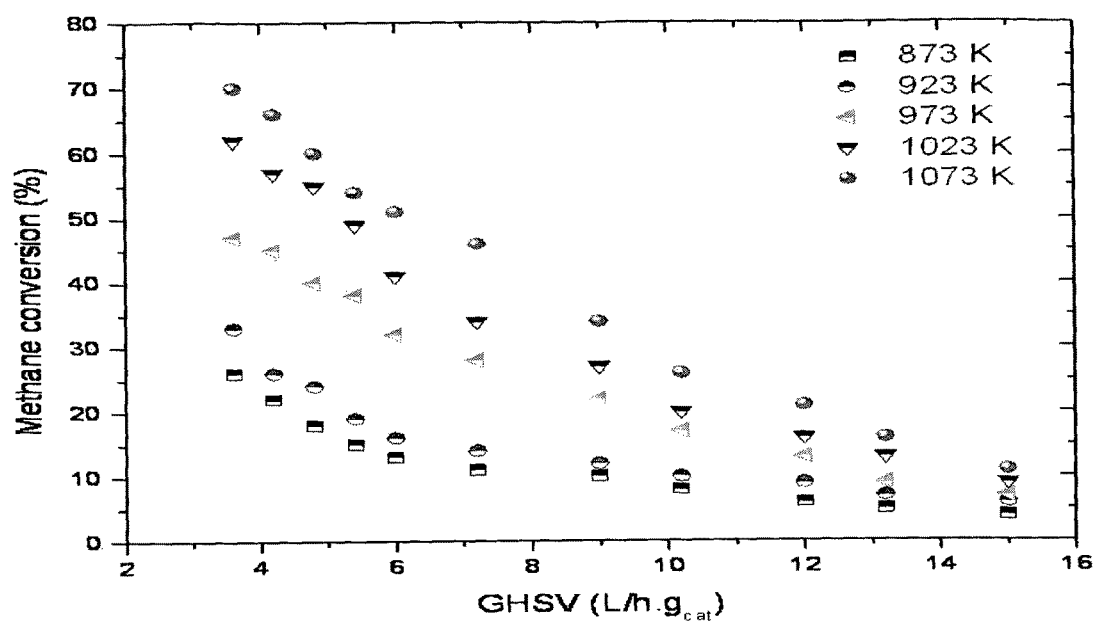
FIG. 2 graphically illustrates the effect of reaction temperature and GHSV (L/h·$g_{cat}$) on the CDM.

Where, $r_0$ is the initial rate of the reaction, $\rho$ is the apparent density, $R_p$ is the radius of the catalyst particle, $\tau$ is the tortuosity, $\epsilon$ is the bed porosity. In the present system, the average values for $\tau$ and $\epsilon$ were taken to be 3 and 0.62, respectively. Apparent density $\rho$ was estimated to be 0.2 $g_{cat}/cm^3$, $R_p$ was determined to be 1.5 mm, $D_{CH_4-N_2}$ is the diffusion coefficient of the methane-nitrogen mixture and $C_S$ is the methane concentration at the external surface of the catalyst particle. For all the experiments, Weisz modulus is <1 which demonstrates that there is no diffusional limitation in the catalyst bed. The GHSV of methane distinctly affected the catalytic performance of Ni—Cu—Zn/Al$_2$O$_3$ catalyst in the temperature range of 600-800° C. (FIG. 2). The maximum methane conversion was obtained at 3.6 L/h·g$_{cat}$ due to higher residence time in the reactor. Conversion increased significantly (26-70%) with increasing the reaction temperature from 550°-800° C. at constant GHSV (3.6 L/h·g$_{cat}$) and similar trends were also observed at other GHSV.

Example 3: Effect of Reaction Temperature on BCNT's Structure

The morphology and size of the nano-tubes formed on 60% Ni-5% Cu-5% Zn-30% Al$_2$O$_3$ catalyst was investigated by increasing the reaction temperature from 550-800° C. at GHSV 3.6 L/h·gcat. FIG. 2 shows the methane conversion with respect to increase in GHSV. In addition to bamboo shaped carbon nano-tubes, some amorphous carbon was also found on the catalysts which may be due to the lower catalytic activity of the nickel particles in which the, carbon was poorly interacted with the nickel catalyst.

Example 4: Effect of Temperature on Methane Decomposition

Figure 3:
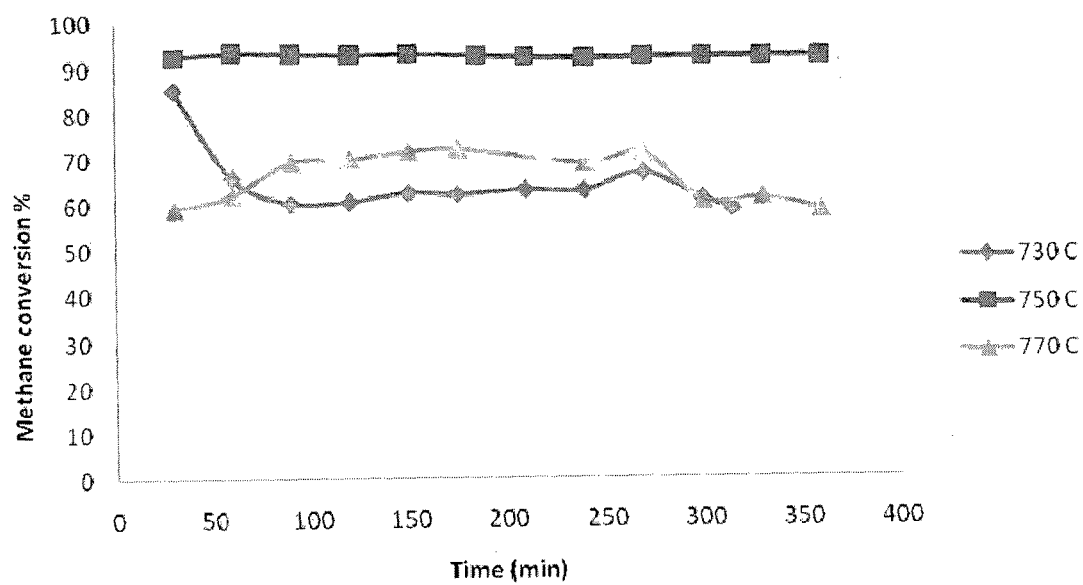
FIG. 3 graphically illustrates the CDM as a function of time at different temperatures on Cu(5%)Zn(5%)-Ni(60%)/Al$_2$O$_3$.
Figure 4:
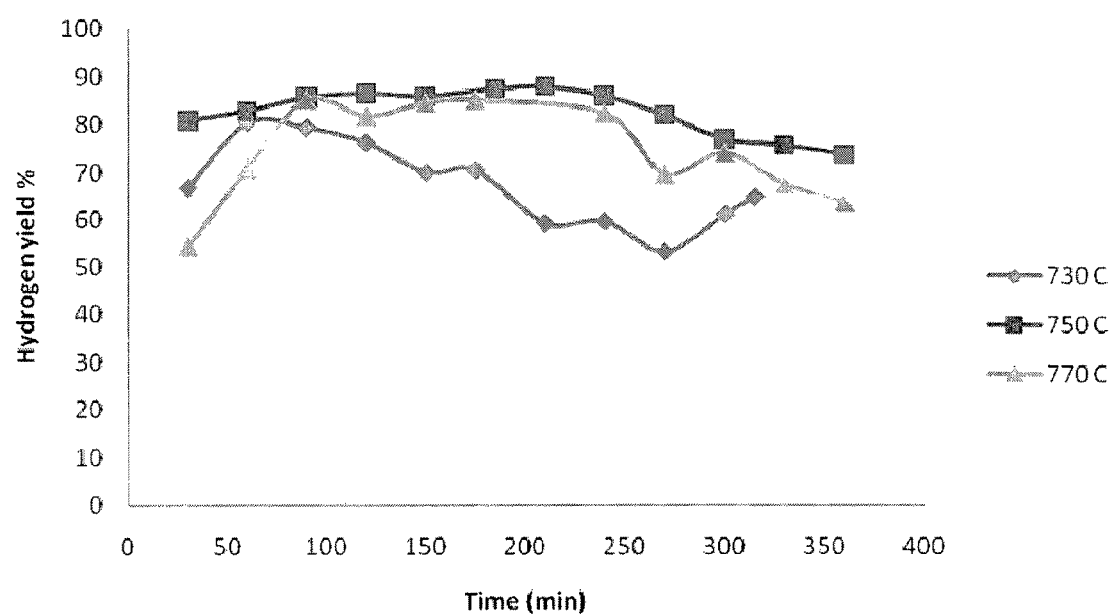
FIG. 4 graphically illustrates the hydrogen yield as a function of time at different temperatures over Cu(5%)Zn(5%)-Ni(60%)/Al$_2$O$_3$.

The nanoporous 60% Ni-5% Cu-5% Zn-30% Al$_2$O$_3$ catalyst was prepared by wet impregnation method. Prerequisite amounts of the transition metal nitrates (Ni:Cu:Zn, 60:5:5) were dissolved in distilled de-ionized water with the required wt % of alumina. The final paste was then dried overnight in an oven and subsequently calcined at 550° C. For each experiment, catalyst was placed in the center of reactor and then purged with nitrogen for 30 min, to ensure the inert atmosphere in the reactor. The catalyst was reduced insitu with hydrogen for 5-6 h at temperature of 450° C. Experiments were carried out to explore the relationship between methane conversion and reaction temperature varied in a range of 730 to 770° C. Total input gas flow rate was fixed at the optimum value of 40 mL/min. Accordingly, gas hourly space velocity (GHSV) was 2.4 L/h·g$_{cat}$. It was observed that even in the closer range, the optimum temperature at which maximum methane conversion and hydrogen production were obtained was 750° C. (FIGS. 3 and 4).

Example 5: Effect of Partial Pressure on Methane

Figure 5:
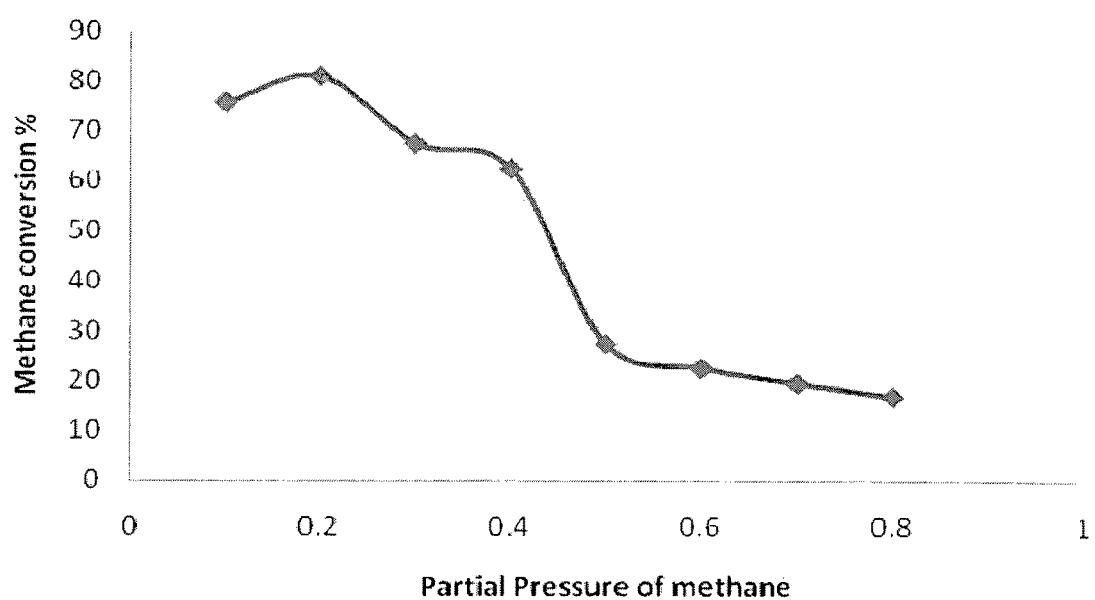
FIG. 5 graphically illustrates the CDM on the effect of partial pressure of methane on methane conversion over Cu(5%)Zn(5%)-Ni(60%)/Al$_2$O$_3$.
Figure 6:
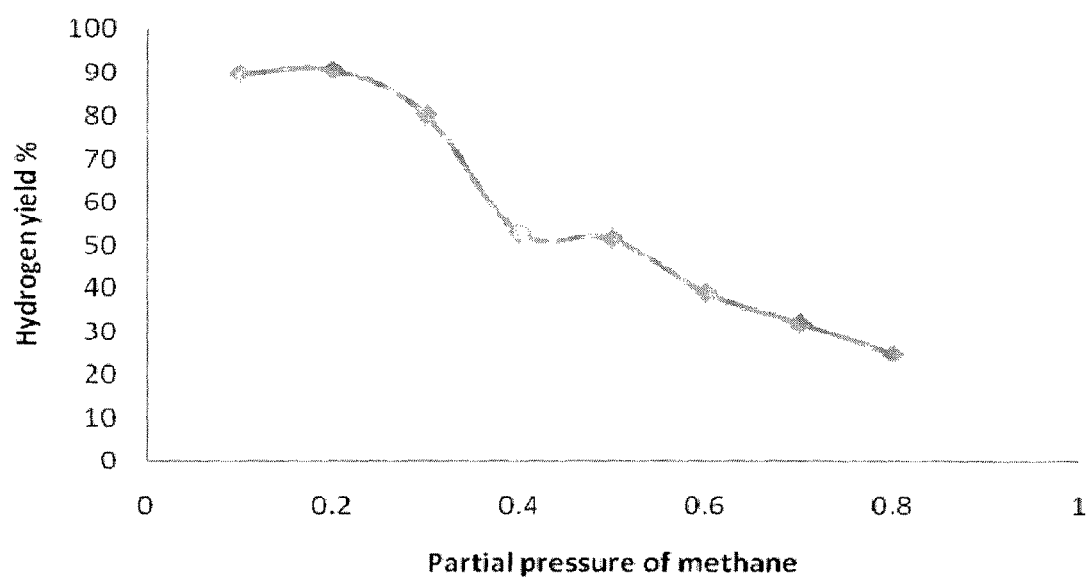
FIG. 6 graphically illustrates the CDM on the effect of partial pressure of methane on hydrogen yield over Cu(5%)Zn(5%)-Ni(60%)/Al$_2$O$_3$.

Experiments were performed to investigate the effect of wider range of partial pressure of methane on methane conversion and CNTs formation at experimental conditions. Effect of partial pressure of methane ($P_{CH4}$) on methane conversion and hydrogen yield was investigated by varying the methane partial pressure from 0.1 to 0.8 atm at 750° C. This was accomplished by conducting the experiments at different flow rates of methane and nitrogen and at different space time (W/FAo=616.33-4930.66 g-cat min/mole of methane). The effect of different methane partial pressures on methane conversion and hydrogen yield is shown in FIGS. 5 and 6. An increase in partial pressure ($P_{CH4}$) lowered the methane conversion due to decrease in the residence time of methane in the reactor. The maximum conversion (81%) and hydrogen yield (91%) was obtained for a space time of 2465.33 g-cat min/mole of methane and $P_{CH4}$ 0.2. It was concluded that the optimum partial pressure would be in between 0.2 and 0.3 which is in accordance with our previous results. An increase of partial pressure of methane (from 0.25 to 1.0 atm) is also unfavorable for the TCD reaction. Regeneration study was carried out on 60% Ni-5% Cu-5% Zn-30% Al$_2$O$_3$ catalyst at 750° C. for up to four regeneration cycles. It was observed that no significant loss of activity (93 to 85%) occurred during repeated decomposition/regeneration cycles.

When the reaction temperature was increased to 750° C., the bamboo-shape of the CNTs was fully developed. In this condition, amorphous carbon was again observed, but this time the formation of amorphous carbon was probably due to the decomposition of carbon on the CNTs. At 750° C., short length bamboo-shaped tubes were produced with some carbon encapsulated metal particles. Further, it was also noticed that a larger diameter CNTs are synthesized at higher reaction temperature. This was mainly due to the aggregation of the nickel particles at high temperatures, leading to the formation of larger catalyst particles and hence contributing CNTs of larger diameter. The BCNTs produced consist of the nano-tubes with the average outer diameters of 30 and 35 nm, at 700 and 750° C. respectively, while at 800° C., the average outer diameter CNTs raised to 50 nm.

Example 6: Methane Decomposition after Successive Separation of Nano-Fibers

Figure 7:
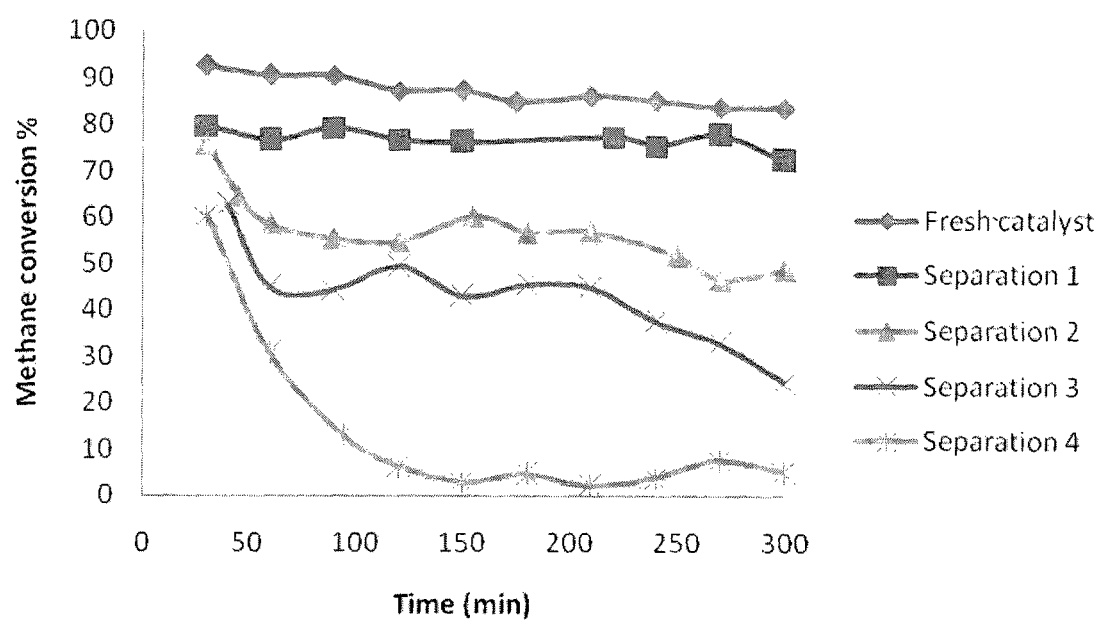
FIG. 7 graphically illustrates the CDM on efficiency as a function of time for different separation cycles without any oxidation treatment.
Figure 8:
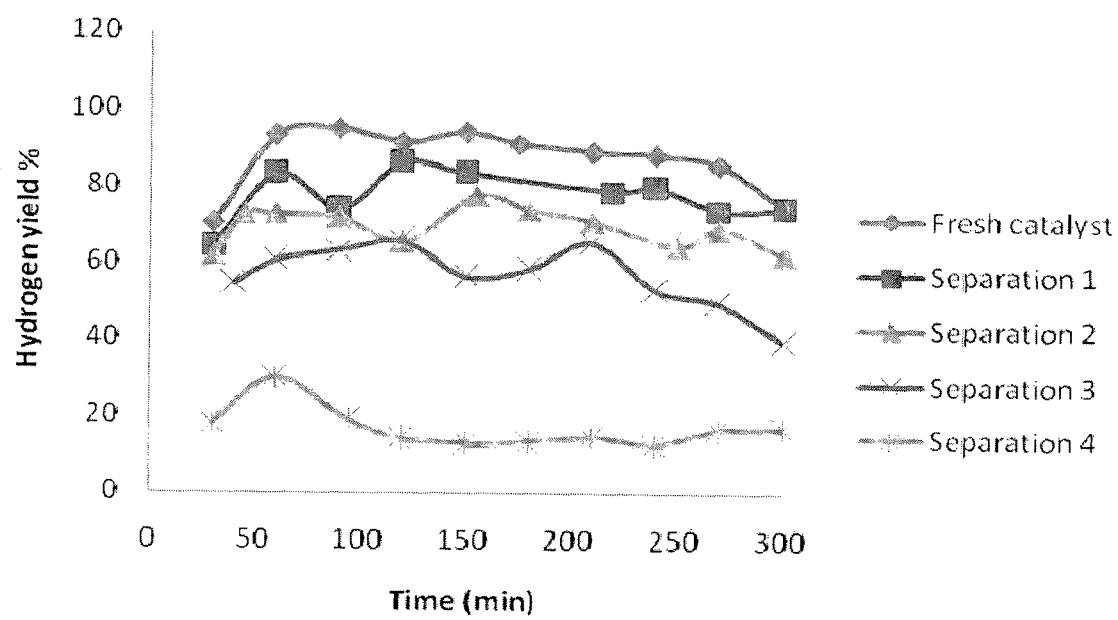
FIG. 8 graphically illustrates the CDM on hydrogen yield as a function of time for different separation cycles without any oxidation treatment.

Reactions were conducted and hydrogen yield was observed for different regenerative cycles after nano-fiber separation from the catalyst without further treatment ie., after sonic separator (without using TGA). The effect of separation of carbon nano-fibers without the burning of amorphous carbon for four consecutive cycles was investigated on methane conversion efficiency. The reaction was carried out at optimum conditions (750° C. and 0.25 partial pressure) for 5 h in each cycle. After each cycle, the catalyst was separated from carbon nano-fibers using sonication for 15 min and the reaction was again carried out on the separated catalyst. This was repeated for three more cycles. The decrease in the methane conversion efficiency and hydrogen yield are given in FIGS. 7 and 8 respectively.

It is seen from the plots that the conversion efficiency is decreasing gradually until 3 cycles, after which there is a steep decrease in conversion efficiency of the catalyst which falls down to 5% approximately. Hydrogen yield is also found to be following the same decrement pattern to around 10%.

Example 7: Centrifugation as a Separation Process of Carbon Nano-Fibres

A high speed cooling centrifuge (~18000 rpm, ~35000 g) was used as the separation equipment in addition to ultrasonic agitator to see if separation efficiency could be improved further. The spent catalyst after initial sonication using ethanol as a solvent is decanted and the supernatant solution containing carbon nanofibers is collected. It is further separated in the centrifuge operated at 15000 rpm for 30 min at 20° C. The centrifuged solution is again decanted and the supernatant solution consisting of CNTs is dried in the oven for 6 h and the catalyst residue for 0.5 h at 100° C. The separated catalyst residue can further be sent for complete regeneration from amorphous carbon or used in the reaction without further processing as required.

Example 8: Influence of Hydrogen as a Carrier Gas

Figure 9:
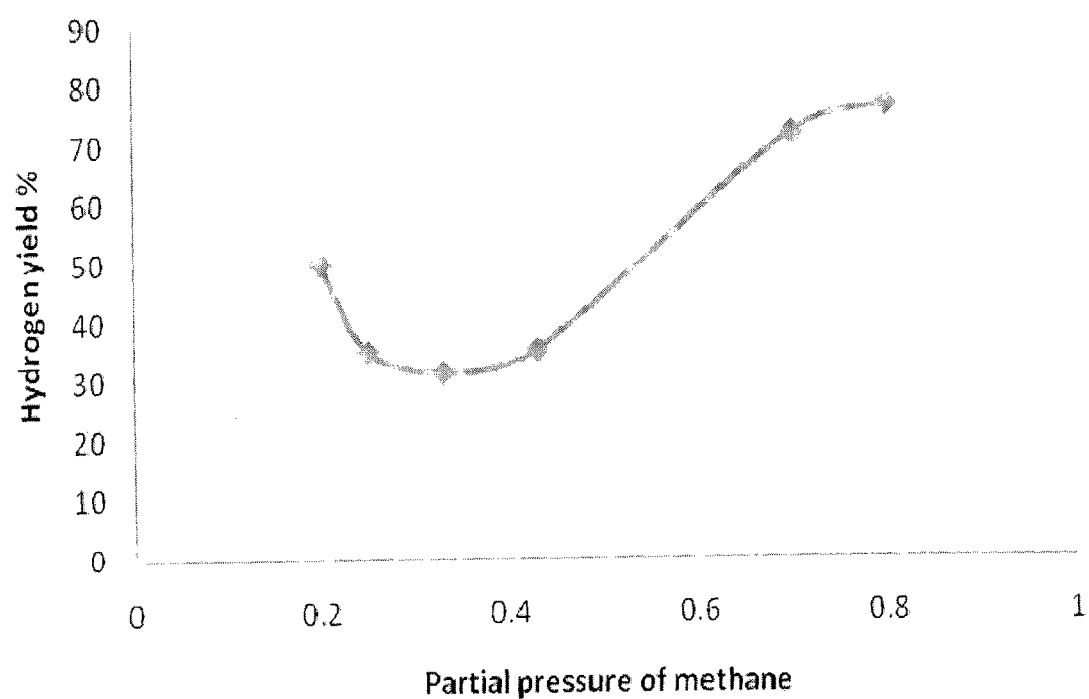
FIG. 9 graphically illustrates the influence of hydrogen carrier gas on the hydrogen yield on Cu(5%)Zn(5%)-Ni(60%)/Al$_2$O$_3$ catalyst.

The study on the effect of hydrogen instead of nitrogen as a carrier gas was carried out to avoid additional separation of product hydrogen gas was carried out. The advantage of this process is that the same hydrogen produced in the reaction can also be used as the carrier gas by recycling. The flow rates of hydrogen were varies from 13 to 40 ml/min and methane from 10 to 48 ml/min for attaining partial pressure of 0.2 to 0.8. The highest methane conversion was obtained for the partial pressure of methane 0.8. This result is different to the result of $N_2$ gas as carrier where the maximum conversion of methane was obtained at 0.2 partial pressure of methane. The reaction was conducted at 750° C. at atmospheric pressure over 60% Ni-5% Cu-5% Zn-30% $Al_2O_3$ catalyst. Each data point was recorded after the reaction time of 6 h (FIG. 9).

Example 9: Test Results

Figure 10:
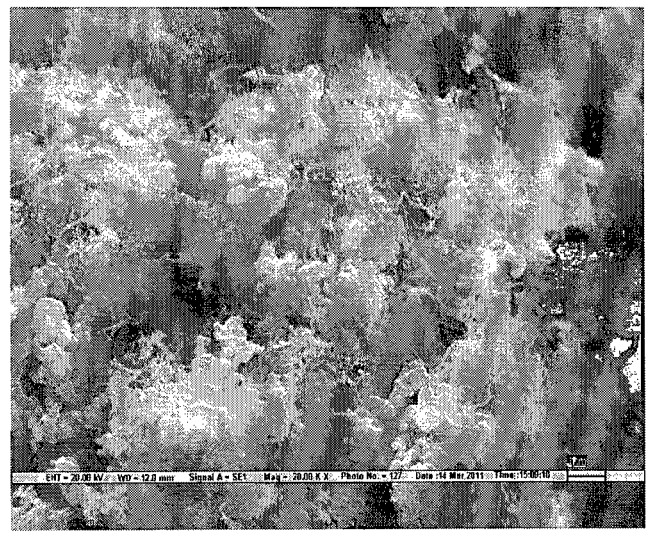
FIG. 10 graphically illustrates SEM micrographs of 60% Ni/Al$_2$O$_3$ and Cu(5%)Zn(5%)-Ni(60%)/Al$_2$O$_3$ spent catalyst after reaction at 750° C.
Figure 11:
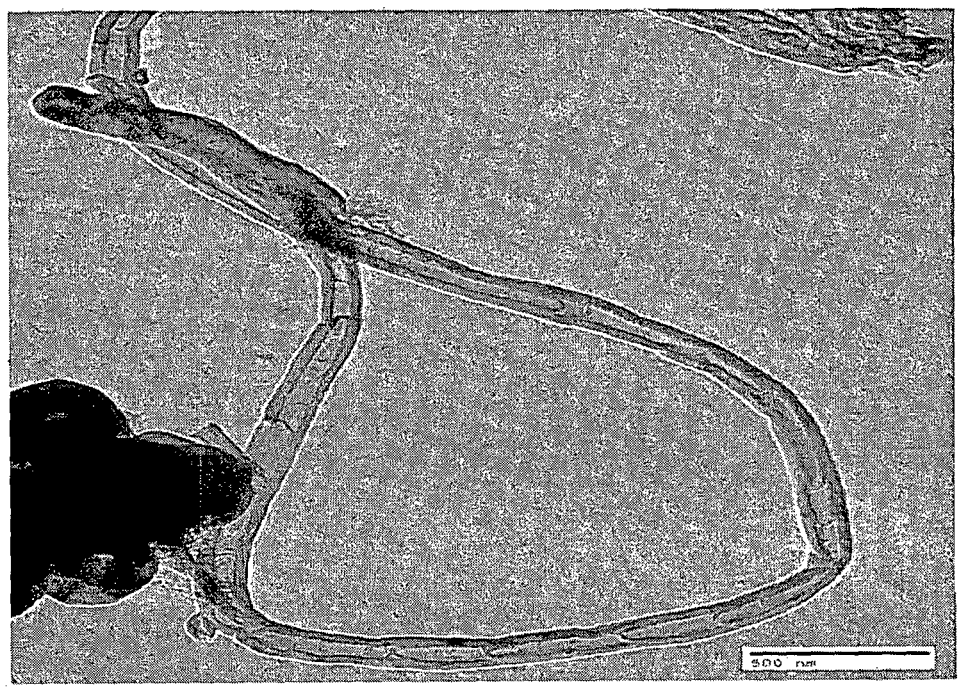
FIG. 11 graphically illustrates TEM micrographs showing the appearance of CNTs catalyst after a CDM run at 750° C.
Figure 12:
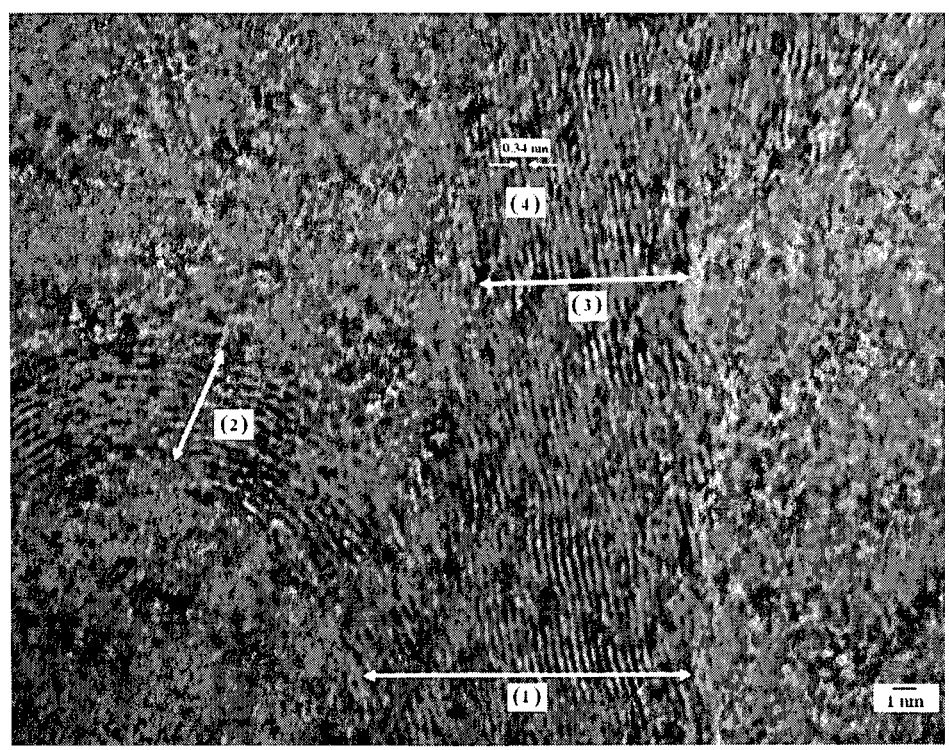
FIG. 12 graphically illustrates HRTEM image of bamboo shaped multi-walled CNT illustrating wall graphite layer (arrow 1), compartment graphitic (arrow 2), after compartmentalization (arrow 3) and graphite plane distance (arrow 4) on catalyst C.

SEM and TEM images of deactivated catalysts revealed that the deposited carbon is filamentous in nature and the Ni has occupied at the tip of the filaments, and the length and nature of the filaments varied with the catalyst compositions. SEM micrographs of 60% Ni/$Al_2O_3$ and 60% Ni-5% Cu-5% Zn-30% $Al_2O_3$ spent catalyst after reaction at 750° C. (FIG. 10). TEM and HTREM images confirmed the high purity bamboo-shaped structure of CNTs produced over 60% Ni-5% Cu-5% Zn-30% $Al_2O_3$ catalyst with outer and inner diameters in the range of 35-40 nm and 10-15 nm, respectively and 2-3 μm in lengths (FIGS. 11 and 12). The filamentous nature of this carbon was also confirmed by Raman spectroscopy. Approximately 84% of the carbon was deposited on the 60% Ni-5% Cu-5% Zn-30% $Al_2O_3$ catalyst, which was comparatively higher than rest of the catalysts. The thick walled CNTs prevented nickel inside the tubes from burning out and the final residual weight percentage remained after TGA treatment was mainly due to the weight of the nickel. Furthermore, FTIR shows the presence of some metal and hydroxyl groups (O—H) impurities present on the as-grown CNTs.

The effect of temperature on the morphology and size of the nano-tubes formed was also investigated by increasing the reaction temperature from 700-800° C. at GHSV 600 mL/h·gcat. It was noticed that a larger diameter CNTs are synthesized at higher reaction temperature. This was mainly due to the aggregation of the nickel particles at high temperatures, leading to the formation of larger catalyst particles which produces CNTs of larger diameter. It was observed that the BCNTs produced consists of the nano-tubes with the average inner diameters of 23±2 and 30±2 nm, at 700 and 750° C. respectively, while at 800° C., the average inner diameter CNTs increased to 45±2 nm.

Example 10: Regeneration Study of the Catalyst

The biggest challenge for hydrogen production by catalytic cracking is the regeneration of the spent catalyst. Catalyst deactivation during the course of a process is often expected. Carbon may plug the pore, such that access is denied for the reactants to many crystallites inside these pores. In extreme cases, strong carbon filaments accumulate in pores to the extent that they exert stress leading to fracture of the support material and ultimately causing disintegration of catalyst pellets and plugging of reactor voids. The reversibility of the catalyst activity is a very important factor for catalysts. Therefore the interest in these catalysts lies not only in their high catalytic activity, but also in the possibility of regenerating them several times so that their "lifetime" is compatible with the cost of their production. In fact, catalyst regeneration may be futile in view of the changes caused to the catalyst support structure as a result of the filament growth process for methane decomposition. Thus if the decomposition of methane is to be utilized for the production of hydrogen in a continuous process, catalysts with high activity and the possibility of regenerating them several times is needed.

Oxidation ($C+O_2 \rightarrow CO_2$) was conducted to regenerate the catalyst activity after reaction. The oxygen regeneration was continued until no $CO_x$ was detected in the products via GC (usually after a period of 4 h). There was slight loss of activity (approximately ±5%) during regeneration cycle. After switching from oxygen to methane, there was a drastic increase in carbon oxides being observed with their concentration declining rapidly during the first 4-5 min of the decomposition reaction. Metal oxides are formed during the regeneration cycle. The formation of carbon oxides at the beginning of the decomposition step could have been produced by the methane interaction with metal oxides and oxygen that adsorbed on the catalyst surface. The hydrogen yields were slightly decreased for all catalysts.

Example 11: Change in the Mass of the Sample as a Function of Temperature

TGA is used to measure changes in the mass of the sample as a function of temperature in a controlled air atmosphere. The mass of the spent catalyst was monitored, against time and temperature in the air using NETZSCH TG 209 F3 instrument with heating rate of 10° C./min. The sample was continuously weighed while being heated to 800° C. in an oxidative atmosphere to study thermal stability of CNTs and the amount of metal impurities. For all catalyst, significant weight loss started at 550° C. and the weight loss continued to increase rapidly at higher temperature, until a stable plateau region appeared around 700° C. 88-90 wt % occur around 550° C. A higher oxidation temperature of BCNTs above 550° C. can be ascribed to the purer, less defective CNT samples. A similar observation was also reported in the literature in the temperature range 500-650° C. and attributed to the oxidation of multiwall CNT (Mordkovich, 2007). The residual weight was observed to be 21-25 wt % that implies 65-85% of the mass on the spent catalyst is carbon.

The formation of carbon is also confirmed by XRD patterns. In addition, a minor weight loss was observed at temperature below 500° C. in the TGA spectrum corresponding to a negligible amount of amorphous carbon in catalyst.

Example 12: Separation of Carbon Nano-Fibers from the Catalyst

A high speed cooling centrifuge (~18000 rpm, ~35000 g) was used as the separation equipment in addition to ultra-sonic agitator to see if separation efficiency could be improved further. The spent catalyst after initial sonication using ethanol as a solvent is decanted and the supernatant solution containing carbon nanofibers is collected. It is further separated in the centrifuge operated at 15000 rpm for 30 mins at 20° C. The centrifuged solution is again decanted and the supernatant solution consisting of CNTs is dried in the oven for 6 h and the catalyst residue for 0.5 h at 100° C. The separated catalyst residue can further be sent for complete regeneration from amorphous carbon or used in the reaction without further processing as required.

Advantages Gained in the Example Illustrative Process in this Subject Matter:

The above mentioned implementation examples as described on this subject matter and its equivalent thereof have many advantages, including those which are described below:

1. $Ni_xCu_yZn_z$ on alumina catalyst resulted in greater than 90% methane conversion (greater than 85% hydrogen yield) at 750° C.
2. The addition of small amounts of Cu as modifying agent (5 wt %) increased the conversion of methane from 78 to 82% at the reaction temperature of 750° C.
3. Addition of both Cu and Zn modifying agent (5 wt %) on $Ni/Al_2O_3$ catalyst increased the conversion and conferred highest methane conversion compared to other catalysts, where conversion was more than 86%.
4. The high purity CNTs were recovered using sonication method.
5. The $Ni_xCu_yZn_z$ on alumina catalyst exhibited a life time of the catalyst in the range of 70-75 h when operated at 750° C.

Although the subject matter has been described in considerable detail with reference to certain examples and implementations thereof, other implementations are possible. As such, the spirit and scope of the appended claims should not be limited to the description of the preferred examples and implementations contained therein.

We claim:

1. A catalyst composition comprising:
   a catalyst in an amount in a range of 60% to 70% w/w of a total weight of the composition, the catalyst being selected from the group consisting of Ni, Co, and Fe;
   at least one first modifying agent in an amount in a range of 3% to 7% w/w of the total weight of the composition, the first modifying agent being selected from the group consisting of Cu, oxides of Cu, and mixtures thereof;
   at least one second modifying agent in an amount in a range of 3% to 7% w/w of the total weight of the composition, the second modifying agent being selected from the group consisting of Zn, oxides of Zn, and mixtures thereof; and
   a support material in an amount in a range of 20% to 40% w/w of the total weight of the composition.

2. The catalyst composition as claimed in claim 1, wherein the support material is selected from the group consisting of alumina, zirconia, titania, silica, niobia, zeolites, MCM-22, mesoporous oxides and microporous oxides.

3. The catalyst composition as claimed in claim 1, wherein the catalyst composition is 60% w/w Ni, 5% w/w Cu, 5% w/w Zn, and 30% w/w $Al_2O_3$.

4. The catalyst composition as claimed in claim 1, wherein the support material is selected from the group consisting of $Al_2O_3$, $SiO_2$, and MCM-22.

5. The catalyst composition as claimed in claim 1, wherein the catalyst composition is capable of catalyzing decomposition of lower hydrocarbons to produce carbon oxides-free hydrogen and carbon nanotubes.

6. The catalyst composition as claimed in claim 5, wherein the lower hydrocarbons are selected from the group consisting of methane, ethane, and mixtures thereof.

7. A catalyst composition comprising:
   a catalyst in an amount in a range of 50% to 70% w/w of a total weight of the composition;
   at least one first modifying agent in an amount in a range of 3% to 7% w/w of the total weight of the composition, the first modifying agent being selected from the group consisting of Cu, oxides of Cu, and mixtures thereof;
   at least one second modifying agent in an amount in a range of 3% to 7% w/w of the total weight of the composition, the second modifying agent being selected from the group consisting of Zn, oxides of Zn, and mixtures thereof; and
   a γ-alumina support material in an amount in a range of 20% to 40% w/w of the total weight of the composition.

8. The catalyst composition as claimed in claim 7, wherein:
   the catalyst is selected from the group consisting of Ni, Co, and Fe.

9. The catalyst composition as claimed in claim 7, wherein the catalyst composition is 60% w/w Ni, 5% w/w Cu, 5% w/w Zn, and 30% w/w γ-alumina.

10. A process for producing a catalyst composition comprising a catalyst in an amount in a range of 10% to 70% w/w of a total weight of the composition, at least one modifying agent in an amount in a range of 1% to 14% w/w of the total weight of the composition, and a support material in an amount in a range of 20% to 70% w/w of the total weight of the composition, the process comprising:
   dissolving at least two salts selected from the group consisting of Ni, Co, Fe, Cu, and Zn in water to obtain a solution;
   adding a support material to the solution to obtain a paste;
   drying the paste at a temperature of 120° C. for a period of 1 h to 48 h to obtain a dried paste;
   calcining the dried paste at a temperature range of 400° C.-600° C. for a period of 1 h to 6 h to obtain a precursor catalyst; and
   reducing the precursor catalyst by hydrogen and in the presence of nitrogen in a temperature range of 380° C.-450° C. for a period of 1 h to 6 h to obtain a catalyst composition.

11. The process as claimed in claim 10, wherein salts of Ni are selected from the group consisting of nickel nitrate, nickel chloride, nickel formate, nickel acetate, and nickel carbonate.

12. The process as claimed in claim 10, wherein salts of Co are selected from the group consisting of cobalt nitrate, cobalt chloride, cobalt formate, cobalt acetate, and cobalt carbonate.

13. The process as claimed in claim 10, wherein salts of Fe are selected from the group consisting of iron nitrate, iron chloride, iron formate, iron acetate, and iron carbonate.

14. The process as claimed in claim 10, wherein salts of Cu are selected from the group consisting of copper nitrate, copper hydroxide, copper carbonate, and copper acetate.

15. The process as claimed in claim 10, wherein salts of Zn are selected from the group consisting of zinc acetate, zinc hydroxide, zinc formate, zinc carbonate, and zinc nitrate.

16. The process as claimed in claim 10, wherein the support material is selected from the group consisting of alumina, zirconia, titania, silica, niobia, zeolites, MCM-22, mesoporous oxides and microporous oxides.

17. The process as claimed in claim 10, wherein the catalyst composition is a mixed oxide with meso or micro pores with nano or microsize of metal (NiO) particles.

18. The process as claimed in claim 10, wherein the catalyst composition is 60% w/w Ni, 5% w/w Cu, 5% w/w Zn, and 30% w/w $Al_2O_3$.

19. The process as claimed in claim 10, wherein the support material is selected from the group consisting of $Al_2O_3$, $SiO_2$, and MCM-22.

* * * * *